(12) United States Patent
Vo et al.

(10) Patent No.: US 8,198,340 B2
(45) Date of Patent: Jun. 12, 2012

(54) QUALITY POLYMER FOAM FROM FLUORINATED ALKENE BLOWING AGENTS

(75) Inventors: Van-Chau Vo, Souffelweyersheim (FR); Richard T. Fox, Midland, MI (US); Warren H. Griffin, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 102 days.

(21) Appl. No.: 12/527,131

(22) PCT Filed: Mar. 10, 2008

(86) PCT No.: PCT/US2008/056405
§ 371 (c)(1),
(2), (4) Date: Aug. 13, 2009

(87) PCT Pub. No.: WO2008/118627
PCT Pub. Date: Oct. 2, 2008

(65) Prior Publication Data
US 2010/0087555 A1    Apr. 8, 2010

Related U.S. Application Data

(60) Provisional application No. 60/920,244, filed on Mar. 27, 2007.

(51) Int. Cl.
*C08J 9/00*    (2006.01)
*C08J 9/12*    (2006.01)
*C08J 9/14*    (2006.01)
*C08J 9/22*    (2006.01)

(52) U.S. Cl. ............... 521/56; 521/60; 521/79; 521/99

(58) Field of Classification Search ............ 521/60, 521/79, 98
See application file for complete search history.

(56) References Cited

U.S. PATENT DOCUMENTS

| | | | |
|---|---|---|---|
| 5,859,082 A * | 1/1999 | Sufi | ............... 521/136 |
| 6,384,095 B1 | 5/2002 | Corr et al. | |
| 7,279,451 B2 | 10/2007 | Singh et al. | |
| 2004/0119047 A1 | 6/2004 | Singh et al. | |
| 2004/0127383 A1 | 7/2004 | Pham et al. | |
| 2004/0256594 A1 | 12/2004 | Singh et al. | |
| 2005/0019549 A1 * | 1/2005 | Tai et al. | ............... 428/315.9 |
| 2006/0043331 A1 | 3/2006 | Shankland et al. | |
| 2006/0142173 A1 | 6/2006 | Johnson et al. | |
| 2006/0202154 A1 | 9/2006 | Flohr et al. | |
| 2007/0010592 A1 * | 1/2007 | Bowman et al. | ............... 521/131 |
| 2007/0100010 A1 | 5/2007 | Creazzo et al. | |

FOREIGN PATENT DOCUMENTS

| | | |
|---|---|---|
| WO | WO2005/105947 | 11/2005 |
| WO | WO2005/108523 | 11/2005 |
| WO | WO2006/094303 | 3/2006 |

OTHER PUBLICATIONS

P.J. Flory, "Principles of Polymer Chemistry," Cornell University Press, Ithaca, New York, 1953.
R.F. Blanks, J.M. Prausnitz, Ind. Eng. Che. Fundamentals, vol. 3, 1-8, 1964.
J. Brandup, E.H. Immergut, E.A. Grulke, Polymer Handbook $4^{th}$ Edition. John Wiley and sons, Inc., p. VII/675-711, 1999.
M. Salame, "Prediction of Gas Barrier Properties of High Polymers," Polymer Engineering Science, December, vol. 26m No. 22, 1543-1546, 1986.
D. Misic and G. Thodos, "Thermal Conductivity of Hydrocarbon Gases at Normal Pressures," A.I.CH.E. Journal, June, vol. 7, 264-267 (1961).
R. Reid, J. Prausnitz and B. Poling, The Properties of Gases and Liquids, $4^{th}$ Edition, McGraw-Hill Book Company, p. 154-157 (1987).

* cited by examiner

*Primary Examiner* — Randy Gulakowski
*Assistant Examiner* — Kara Boyle
(74) *Attorney, Agent, or Firm* — Steven W. Mork

(57) ABSTRACT

Alkenyl aromatic polymer foam comprising a polymer matrix containing one or more polymer and defining a plurality of cells having an average cell size wherein: (a) the alkenyl aromatic polymer foam has: —(i) an average cell size that is in a range of 0.02 and 5 millimeters; —(ii) a density of 64 kilograms per cubic meter or less; —(iii) an open cell content less than 30 percent; and —(iv) a cell size variation of 30% or less; and wherein the foam further comprises one or more fluorinated alkene blowing agent at a concentration of 0.03 moles or more and 0.3 moles or less per 100 grams of polymer foam.

18 Claims, No Drawings

QUALITY POLYMER FOAM FROM FLUORINATED ALKENE BLOWING AGENTS

CROSS REFERENCE STATEMENT

This application claims the benefit of U.S. Provisional Application No. 60/920,244, filed Mar. 27, 2007.

BACKGROUND OF THE INVENTION

1. Field of the Invention

The present invention relates to a process for preparing thermally insulating polymer foam, the thermally insulating polymer foam and a process for using a thermally insulating polymer foam.

2. Description of Related Art

There is an international desire to find and implement environmentally friendly blowing agents for preparing thermally insulating polymer foam. Environmentally friendly blowing agents have little or no detrimental impact on the environment. Two measures of detrimental environmental impact are Ozone Depletion Potential (ODP) and Global Warming Potential (GWP).

Hydrofluorocarbon (HFC) and fluorocarbon (FC) blowing agents have been one focus of recent thermally insulating polymer foam development due to their low thermal conductivity and their zero ODP relative to former blowing agents such as hydrochlorofluorocarbons (HCFC) and chlorofluorocarbons (CFC). However, even HFC and FC blowing agents tend to have GWPs higher than is desirable. For example, 1,1,1,2-tetrafluoroethane (HFC-134a) has a GWP of 1300 and 1,1-difluoroethane (HFC-152a) has a GWP of 140 (see United States patent application 2006/0202154, paragraph 25). An environmentally friendly blowing agent desirably has a GWP below 50. Therefore, exploration for a more environmentally friendly blowing agent continues.

Recent literature reveals that fluorinated olefins (fluoroalkenes) may be an attractive replacement for HFCs in many applications, including blowing agents, because they have a zero ODP, a lower GWP than HFCs, and high insulating capability (low thermal conductivity). See, for example United States patent application (USPA) 2004/0119047, 2004/0256594, 2007/0010592 and PCT publication WO 2005/108523. These references teach that fluoroalkenes can be suitable for blowing agents and are attractive because they have a GWP below 1000, preferably not greater than 75. USPA 2006/0142173 discloses fluoroalkenes that have a GWP of 150 or less and indicates a preference for a GWP of 50 or less.

Besides being environmentally friendly, a blowing agent for thermally insulating polymer foam desirably: (1) is sufficiently soluble in the polymer matrix of the foam so as to enable preparation of quality foam; (2) has a low thermal conductivity; and (3) has low permeability through (that is, has longevity in) the polymer matrix of the foam so to provide long-term thermally insulating capability.

Blowing agent solubility in the polymer matrix of a polymer foam is important in order to ensure several aspects of a quality foam. A quality polymer foam has an average cell size of 0.02 to 5 millimeters, is close-celled and has a density of 64 kg/m$^3$ or less. If a blowing agent is insufficiently soluble in the polymer matrix it tends to result in a foam suffering from one or more of the following: a small average cell size, high density (greater than 64 kg/m$^3$), high open cell content, and blowholes. (See, for example, teaching in PCT publication WO 98/03581 on page 12, lines 22-27). A quality foam also has a largely uniform cell size distribution. A quality foam is desirably essentially free of blowholes. If a blowing agent is too insoluble in the polymer matrix it may also cause blowholes as it rapidly expands out of the polymer matrix. Blowholes are voids the size of multiple cell diameters and are easily observed by the naked eye. Blowholes often cause an undesirably irregular foam surface as the blowing agent rapidly erupts through the foam surface during the foaming process.

Low thermal conductivity and high longevity in a polymer matrix is desirable to maximize a polymer foam's thermal insulating capability over time. A blowing agent having a high permeability in a polymer matrix will readily escape from a foam made from that polymer matrix. Therefore, it is desirable for a thermally insulating blowing agent to have a low permeability through the polymer matrix in which it resides.

USPA 2004/0119047, 2004/0256594, 2006/0142173, 2007/0010592 and PCT publication WO 2005/108523 each suggest that fluoroalkenes may be environmentally friendly and capable of forming a polymer foam. However, none of these references disclose if any of the fluoroalkenes actually have a GWP below 50, let alone whether any of the fluoroalkenes have a permeability in alkenyl aromatic polymers low enough to provide long-term thermal insulating capability or are capable of preparing a quality thermally insulating polymer foam.

Therefore, it remains desirable and would be surprising to identify a blowing agent with all of the following properties: a zero ODP, a GWP less than 50, a low thermal conductivity and low permeability through an alkenyl aromatic polymer matrix of a polymer foam, and a solubility in alkenyl aromatic polymers sufficiently high that the blowing agent can comprise more than 50 wt % of a blowing agent composition useful for producing a quality alkenyl aromatic foam.

BRIEF SUMMARY OF THE INVENTION

The present invention advances the art of thermally insulating alkenyl aromatic polymer foam by surprisingly discovering specific blowing agents that concomitantly have a zero ODP, a GWP less than 50, a solubility in alkenyl aromatic polymers that allows them to comprise more than 50 wt % of a blowing agent composition that produces a quality alkenyl aromatic foam while having both a low thermal conductivity and a low permeability through alkenyl aromatic polymers for the manufacture of quality thermally insulating alkenyl aromatic polymer foam.

In particular, the present invention identifies and employs a blowing agent containing one or more than one specific fluorinated alkene having three or four carbons that has a solubility in alkenyl aromatic polymers, especially polystyrene, sufficient to prepare quality thermally insulating polymer foam using a blowing agent containing at least 50 wt %, preferably 75 wt %, more preferably 100 wt % of the one or more fluorinated alkene.

In a first aspect, the present invention is an alkenyl aromatic polymer foam comprising a polymer matrix containing one or more polymer and defining a plurality of cells having an average cell size wherein: (a) the alkenyl aromatic polymer foam has an average cell size according to ASTM method D-3576-04 that is in a range of 0.02 and 5 millimeters, a density of 64 kilograms per cubic meter or less according to ISO method 845-85, and an open cell content less than 30 percent according to ASTM method D6226-05; and (b) 50 weight-percent or more of the one or more polymer consists of one or more polymer selected from a group consisting of alkenyl aromatic polymers; wherein the alkenyl aromatic polymer foam further comprises one or more fluorinated alkene blowing agent at a concentration of 0.03 moles or more and 0.3 moles or less per 100 grams of polymer foam, the one or more fluorinated alkene blowing agent being selected from a group consisting of: hexafluoropropene; 2-fluoropropene, 1-fluoropropene; 1,1-difluoropropene; 3,3-difluoropropene; 3,3,3-trifluoropropene; 2,3,3-trifluoropropene; 1,3,3,3-tetrafluoropropene; 1,1,3,3-tetrafluoropropene; 1,2,3,3,3-pentafluoropropene; 4,4,4-trifluoro-1-butene; 3,4,4,4-tetrafluoro-1-butene; 1,1,3,3,3-pentafluoro-2-methyl-1-propene; octafluoro-1-butene; octafluoro-2-butene; 2,3,3,4,4,4-hexafluoro-1-butene; 1,1,1,4,4,4-hexafluoro-2-butene; 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene.

Desirable embodiments of the first aspect include one or any combination of the following further characteristics: the one or more fluorinated alkene is selected from a group consisting of 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene; the one or more fluorinated alkene is the only blowing agent in the alkenyl aromatic polymer foam; and the alkenyl aromatic polymer is one or more polymer selected from polystyrene polymers and styrene-acrylonitrile copolymers;

In a second aspect, the present invention is a process for preparing an alkenyl aromatic polymer foam comprising the following steps in order: (a) providing a foamable composition comprising a polymer and a blowing agent, wherein more than 50 weight-percent of the polymer consists of one or more alkenyl aromatic polymer; and (b) expanding the foamable composition into a polymer foam; wherein the blowing agent comprises one or more fluorinated alkene at a concentration of 0.03 moles or more and 0.3 moles or less per 100 grams of polymer, the fluorinated alkene being selected from a group consisting of: hexafluoropropene; 2-fluoropropene, 1-fluoropropene; 1,1-difluoropropene; 3,3-difluoropropene; 3,3,3-trifluoropropene; 2,3,3-trifluoropropene; 1,3,3,3-tetrafluoropropene; 1,1,3,3-tetrafluoropropene; 1,2,3,3,3-pentafluoropropene; 4,4,4-trifluoro-1-butene; 3,4,4,4-tetrafluoro-1-butene; 1,1,3,3,3-pentafluoro-2-methyl-1-propene; octafluoro-1-butene; octafluoro-2-butene; 2,3,3,4,4,4-hexafluoro-1-butene; 1,1,1,4,4,4-hexafluoro-2-butene; 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene.

Desirable embodiment of the second aspect include one or any combination of the following further characteristics: more than 50 weight-percent of the blowing agent consists of one or more of the fluorinated alkenes; the blowing agent further comprises one or more blowing agent selected from a group consisting of fluorinated alkanes having from one to five carbons, hydrocarbons having from one to nine carbons, alcohols having from one to two to five carbons, water and carbon dioxide; the blowing agent consists of the one or more fluorinated alkene and one or more blowing agent selected from carbon dioxide and water; the one or more fluorinated alkene is selected from a group consisting of 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene; the blowing agent consists of the one or more fluorinated alkene; the alkenyl aromatic polymer is one or more polymer selected from polystyrene polymers, styrene-acrylonitrile copolymer and blends thereof; the one or more alkenyl aromatic polymer comprises 95 weight-percent or more of the polymer in the foamable composition; the process is an extrusion process where step (a) includes softening the polymer in an extruder, mixing the blowing agent into the softened polymer at an addition temperature and addition pressure to form the foamable composition and then cooling the foamable composition to a foaming temperature and step (b) includes expelling the foamable composition through a die at the foaming temperature into an environment at a lower pressure than the mixing pressure; and the process is an expanded bead foam process where the foamable composition in step (a) is in the form of beads and step (b) includes steam expanding the polymer beads.

In a third aspect, the present invention is a method of using the alkenyl aromatic polymer foam of the first aspect comprising the step of positioning the polymer foam between two areas where one of the two areas experiences a different temperature than the other area.

DETAILED DESCRIPTION OF THE INVENTION

Terms

"Quality foam" and "quality polymer foam" refer to a polymer foam having:
(i) an average cell size between 0.02 and 5 millimeters according to ASTM method D-3576-04;
(ii) less than 30% open cell content according to ASTM method D6226-05;
(iii) a density of 64 kg/m$^3$ or less according to International Organization for Standards (ISO) method 845-85; and (iv) a cell size variation of 30% or less, preferably 25% or less, more preferably 20% or less, still more preferably 10% or less, yet more preferably 5% or less and most preferably 0%.

"Cell size variation" is a measure of cell size distribution or uniformity in a foam. The cell size variation of a foam is a percent variation between an average cell size within a circular portion of an entire cross section of the foam that contains the centroid of the cross section and that is 25% of the cross sectional area of the entire cross section and an average cell size for the entire cross section. Determine cell size variation by taking the absolute value of the difference between the average cell sizes for the entire cross section and the circular portion of the entire cross section, dividing that value by the average cell size of the entire cross section and multiplying by 100%. Cell size variation serves as an indicator of the difference in cell size proximate to a foam's center relative to proximate to the foam's surface. A larger cell size variation corresponds to a larger difference in cell sizes in these two regions of a foam. Large cell size variation is undesirable.

"Quality alkenyl aromatic polymer foam" refers to a quality foam that is an alkenyl aromatic polymer foam, that is, more than 50% of all polymers in the foam are alkenyl aromatic polymers.

Desirably, a quality foam is also "essentially free of blowholes." A polymer foam is "essentially free of blowholes" if there are no blowholes evident on a surface of the foam. Ideally, a quality foam is free of blowholes, meaning that there are no blowholes evident throughout the foam upon visual inspection by an unaided eye.

"Solubility PS" values for blowing agents in Tables 1-4 refers to solubility in polystyrene at 25 degrees Celsius (° C.) and one atmosphere of pressure. Calculate solubility of a blowing agent in a polymer using the Flory-Huggins equation as described in P. J. Flory, "Principles of Polymer Chemistry", Cornell University Press, Ithaca, N.Y., 1953 (incorporated herein by reference). The entropy term ($\chi_S$) of the interaction parameter for polar and non-polar systems is nearly constant and equal to 0.34, as reported in R. F. Blanks, J. M. Prausnitz, Ind. Eng. Che. Fundamentals, vol. 3, 1-8, 1964 (incorporated herein by reference). The enthalpic term ($\chi_H$) of the interaction parameter can be related to the Hilderbrand parameters as detailed in J. Brandup, E. H. Immergut, E. A. Grulke, Polymer Handbook, $4^{th}$ Ed. John Wiley and sons, Inc., page VII/675-711, 1999 (incorporated herein by reference).

"Permeability PS" values for blowing agents in Tables 1-4 refers to permeability through polystyrene at 25° C. Calculate permeability of a blowing agent through a polymer using the Salame semi-empirical equation, as report by in M. Salame, "Prediction of Gas Barrier Properties of High Polymers", Polymer Engineering Science, December, Vol. 26, No 22, 1543-1546, 1986 (incorporated herein by reference).

Alkenyl Aromatic Polymer Foam

The alkenyl aromatic polymer foam ("polymer foam") of the present invention comprises a polymer matrix containing one or more polymer and defining a plurality of cells. Typically, at least 50 weight-percent (wt %) of the polymer matrix is one or more polymer (that is, "polymer material"). The polymer material typically accounts for all polymer in the polymer matrix. Desirably, polymer material typically makes up 75 wt % or more, preferably 80 wt % or more, more preferably 90 wt % or more and can make up 100 wt % of the polymer matrix, based on weight of the polymer matrix.

At least 50 wt % of the polymer material is one or more polymer selected from a group consisting of alkenyl aromatic polymers. Desirably, 75 wt % or more, 90 wt % or more, 95 wt % or more, or even 100 wt % of the polymer material is one or more alkenyl aromatic polymer. Alkenyl aromatic polymers are polymers containing alkenyl aromatic monomer units such as styrene (vinyl benzene), alpha-methyl styrene, ethyl styrene, vinyl toluene, chlorostyrene and bromostyrene. Alkenyl aromatic polymers include homopolymers of alkenyl aromatic monomer units and copolymers containing alkenyl aromatic monomer units (both graft and copolymerized copolymers). "Copolymers" includes random copolymers, alternating copolymers and block copolymers. "Copolymers" may be linear and branched.

Desirably, the alkenyl aromatic polymer is selected from polystyrene polymers, styrene-acrylonitrile (SAN) copolymers and combinations thereof. The polymer material advantageously contains one or more SAN copolymer since SAN copolymers offer processing and application advantages over polystyrene polymers, advantages including better dimensional stability and chemical resistance. In fact, it is desirable for the polymer material to contain one wt % or more, preferably five wt % or more, still more preferably ten wt % or more polymerized acrylonitrile (AN) component and 35 wt % or less, preferably 30 wt % or less and more preferably 25 wt % or less polymerized AN component. If the concentration of AN is less than 1 wt % the advantages of the AN component are minimally evident if at all. If the concentration of AN is greater than 35 wt % the polymer viscosity becomes high enough that processing into a foam becomes difficult.

Desirably polymers comprising the polymer material, particularly the alkenyl aromatic polymers have a weight-averaged molecular weight (Mw) of 70,000 or more and 1,000,000 or less and a polydispersity (Mw divided by number-average molecular weight (Mn)) of 1.0 or more and 10 or less.

In addition to polymer material, the polymer matrix may contain one or more additives. Typical additives include flame retardant components (halogenated compounds including brominated materials, phosphorous compounds, sulfur containing compounds and synergistic combinations of components useful enhancing flame retardancy), infrared attenuating materials (for example, all forms of carbon black, graphite, Mica, aluminum powder, aluminum flake, aluminum oxide and titanium dioxide), synthetic and natural clays, including absorbent clays (for example, kaolinite, montmorillonite, and exfoliated clays), lubricants (for example, stearates), colorants and pigments, and other inert or reactive filler materials. Additives can be present at a concentration of less than 50 wt %, typically up to 20 wt % based on polymer matrix weight.

The polymer matrix defines a plurality of cells within the polymer matrix. The cells have an average cell size of 0.02 millimeters (mm) or more, preferably 0.05 mm or more, more preferably 0.1 mm or more and have a cell size of 5 mm or less, preferably 3 mm or less, more preferably 1 mm or less, still more preferably 0.75 mm or less. If the average cell size of a foam is less than 0.02 mm the foam density tends to be undesirably high. If the average cell size is greater than 5 mm the thermal conductivity of the foam tends to be undesirably high. Measure average cell size according to ASTM method D-3576-04.

The polymer foam desirably has a monomodal cell size distribution. A foam has a monomodal cell size distribution if a plot of the number of cells versus cell size (rounded to nearest 0.05 millimeters (mm)) reveals one peak. In contrast, a foam having a multimodal cell size distribution reveals more than one peak in a similar plot. Measure at least 100 cells from a cut foam surface to create a plot for determining whether a foam is monomodal or multimodal. Measure cell size according to ASTM method D-3576-04. A peak occurs at a given cell size in such a plot at a given cell size if the population remains unchanged or continues to decrease for two immediately smaller and two immediately larger cell sizes adjacent to the given cell size. The polymer foam may have a multimodal (including bimodal) cell size distribution as long as the cell size variation falls within the range of a quality foam.

The polymer foam may be open or closed celled. Desirably, the polymer foam is close-celled which means that the foam has an open-cell content of 30% or less, preferably 20% or less, more preferably 10% or less, still more preferably 5% or less and can have an open-cell content of 0%. Measure open cell content according to American Society for Testing and Materials (ASTM) method D6226-05.

The polymer foam further comprises one or more than one fluorinate alkene blowing agent selected from a group consisting of those fluorinated alkenes listed in Table 1 and Table 2.

TABLE 1

| Chemical Formula | CAS number | Name(s) | Mw | Solubility PS pph/atm | Permeability PS cc · mil/ 100 in$^2$ · day · atm |
|---|---|---|---|---|---|
| CH2=CH—CH2F | 818-92-8 | 3-fluoro propene | 60.1 | 5.5 | 5.95 |
| CH2=CF—CH2F | 59486-57-6 | 2,3-difluoro-propene | 78.1 | 6.3 | 1.34 |
| CHF=CH—CHF2 | 721945-76-2 | 1,3,3-Trifluoro-propene | 96.1 | 7.8 | 2.00 |
| CF2=CH—CH2F | 58777-31-4 | 1,1,3-Trifluoro-propene | 96.1 | 4.2 | 0.94 |
| CF2=CF—CH3 | 563-85-9 | 1,1,2-Trifluoro-propene | 96.1 | 3.7 | 0.39 |
| CHF=CH—CH2—CH3 | 1682-71-9 | 1-Fluoro-butene | 74.1 | 8.9 | 0.36 |
| CH2=CF—CH2—CH3 | 430-44-4 | 2-Fluoro-butene | 74.1 | 7.0 | 0.13 |
| CH3—CF=CH—CH3 | 430-45-5 | 2-Fluoro-2-butene | 74.1 | 8.6 | 0.23 |
| CH2=CH—CH2—CHF2 | 119255-11-7 | 4,4-Difluoro-1-butene | 92.1 | 5.4 | 0.09 |
| CF2=CH—CH2—CH3 | 407-09-0 | 1,1-Difluoro-1-butene | 92.1 | 6.0 | 0.07 |
| CH2=CH—CF2—CH3 | 373-90-0 | 3,3-difluoro-1-Butene | 92.1 | 3.7 | 0.05 |
| CH2=CH—CHF—CHF2 | 721945-90-0 | 3,4,4-Trifluoro-1-butene | 110.1 | 7.9 | 0.04 |
| CH2=CF—CF2—CH3 | 721945-86-4 | 2,3,3-Trifluoro-1-butene | 110.1 | 8.5 | 0.02 |
| CF2=CH—CF2—CH3 | 721970-16-7 | 1,1,3,3-Tetrafluoro-1-butene | 128.1 | 6.3 | 0.01 |
| CH2=CF—CH2—CF3 | 721946-02-7 | 2,4,4,4-Tetrafluoro-1-butene | 128.1 | 4.5 | 0.01 |
| CHF=CH—CH2—CF3 | 721945-98-8 | 1,4,4,4-Tetrafluoro-1-butene | 128.1 | 8.5 | 0.02 |
| CH2=CH—CF2—CHF2 | 40723-71-5 | 3,3,4,4-Tetrafluoro-1-butene | 128.1 | 4.2 | 0.01 |
| CF3—CF=CH—CH3 | 74728-73-7 | 1,1,1,2-Tetrafluoro-2-butene | 128.1 | 4.8 | 0.01 |
| CF2=CH—CH2—CF3 | 721946-08-3 | 1,1,4,4,4-Pentafluoro-1-butene | 146.1 | 3.7 | 0.004 |
| CH2=CF—CF2—CHF2 | 721946-10-7 | 2,3,3,4,4-Pentafluoro-1-butene | 146.1 | 7.0 | 0.004 |
| CHF=CF—CF2—CF3 | 83227-57-0 | 1,2,3,3,4,4,4-Heptafluoro-1-butene | 182.0 | 3.4 | 0.001 |
| CF2=CF—CHF—CF3 | 60002-06-4 | 1,1,2,3,4,4,4-Heptafluoro-1-butene | 182.0 | 4.3 | 0.001 |
| CHF=C(CF3)2 | 2714-31-0 | 1,3,3,3-tetrafluoro-2-(trifluoromethyl)-Propene, | 182.0 | 5.9 | 0.002 |

TABLE 2

| | Solubility PS | Permeability PS cc · mil/ |

These select fluorinated alkenes in Tables 1 and 2 share a desirable feature in that they all concomitantly have a zero ODP, a GWP less than 50, sufficient solubility in alkenyl aromatic polymers to be used as 50 wt % or more of a blowing agent for use in producing quality alkenyl aromatic foam and they all have both a low thermal conductivity and a low permeability through alkenyl aromatic polymers which makes them ideal for preparing quality thermally insulating polymer foams. In particular, each of these blowing agents has an estimated permeability through alkenyl aromatic polymers of less than 20 cubic centimeters*mil per 100 square inches per day per atmosphere of pressure.

While all of the suitable fluorinated alkenes have three or four carbons, surprisingly not all three to four carbon fluorinated alkenes qualify as members of this group of suitable fluorinated alkenes. Some three and four carbon fluorinated alkenes have too low of a solubility in polystyrene to be suitable and others have too high of a solubility in polystyrene to be suitable.

Table 3 lists three and four carbon fluorinated alkenes that are unsuitable because they have such a low solubility in styrenic polymers that they tend produce high density (greater than 64 kg/m$^3$) foam when constituting greater than 50 wt % of a blowing agent used to prepare the foam. While these fluorinated alkenes may be present as an additional blowing agent, they are not suitable as the fluorinated alkene required in the present invention.

TABLE 3

| Chemical Formula | CAS number | Name(s) | Mw | Solubility PS pph/atm | Permeability PS cc · mil/ 100 in$^2$ · day · atm |
|---|---|---|---|---|---|
| CH2=CF—CF3 | 754-12-1 | 2,3,3,3-tetrafluoro-propylene (R1234yf) | 114.0 | 0.3 | 0.06 |
| CF2=CH—CF3 | 690-27-7 | 1,1,3,3,3-pentafluoro-propylene (R-1225zc) | 132.0 | 0.3 | 0.03 |
| CF2=CF—CF3 | 116-15-4 | Hexafluoro-propylene; (R-1216) | 150.0 | 0.3 | 0.01 |
| CF2=CH—CH=CH2 | 590-91-0 | 1,1-Difluoro-1,3-butadiene | 92.1 | 0.6 | 0.10 |
| CH2=CH—CF2—CF3 | 374-27-6 | 3,3,4,4,4-Pentafluoro-1-butene | 146.1 | 0.5 | 0.002 |

Table 4 lists four carbon fluorinated alkenes that are unsuitable for having such a high solubility in styrenic polymer that they act as strong plasticizers. Therefore, if a blowing agent consisted of more than 50 wt % of one or more of the following fluorinated alkenes the resulting foam would have poor dimensional stability due to the plasticizing effect of the blowing agents. While these fluorinated alkenes may be present as an additional blowing agent, they are not suitable as the fluorinated alkene required in the present invention.

TABLE 4

| Chemical Formula | CAS number | Name(s) | Mw | Solubility PS pph/atm | Permeability PS cc · mil/ 100 in$^2$ · day · atm |
|---|---|---|---|---|---|
| CHF=CH—CH2—CH2F | 721970-14-5 | 1,4-Difluoro-1-butene | 92.1 | 41.4 | 0.30 |
| CHF=CF—CH2—CH3 | 721970-13-4 | 1,2-Difluoro-1-butene | 92.1 | 43.9 | 0.21 |
| CH3—CF=CF—CH3 | 721946-18-5 | 2,3-Difluoro-2-butene | 92.1 | 50.6 | 0.15 |
| CH2F—CH=CF—CH3 | 721946-16-3 | 1,3-Difluoro-2-butene | 92.1 | 49.2 | 0.22 |
| CH2F—CH=CH—CH2F | 407-81-8 | 1,4-Difluoro-2-butene | 92.1 | 50.4 | 0.35 |
| CH2=C=(CH2F)2 | 400-11-3 | 1-Propene, 3-fluoro-2-(fluoromethyl) | 92.1 | 39.8 | 0.31 |
| CHF=CH—CHF—CH2F | 721945-84-2 | 1,3,4-Trifluoro-1-butene | 110.1 | 61.5 | 0.21 |
| CHF=CF—CH2—CH2F | 721945-82-0 | 1,2,4-Trifluoro-1-butene | 110.1 | 140.0 | 0.10 |
| CHF=CF—CHF—CH3 | 721945-81-9 | 1,2,3-Trifluoro-1-butene | 110.1 | 55.1 | 0.13 |
| CH2F—CF=CH—CH2F | 721946-27-6 | 1,2,4-Trifluoro-2-butene | 110.1 | 136.8 | 0.15 |
| CH2F—CF=CF—CH3 | 721946-26-5 | 1,2,3-Trifluoro-2-butene | 110.1 | 126.3 | 0.09 |
| CHF2—CH=CH—CH2F | 721946-24-3 | 1,1,4-Trifluoro-2-butene | 110.1 | 44.4 | 0.11 |
| CF2=CF—CH2—CH2F | 721970-15-6 | 1,1,2,4-Tetrafluoro-1-butene | 128.1 | 62.6 | 0.02 |
| CHF=CH—CF2—CH2F | 721945-96-6 | 1,3,3,4-Tetrafluoro-1-butene | 128.1 | 41.5 | 0.04 |
| CHF=CF—CH2—CHF2 | 721945-95-5 | 1,2,4,4-Tetrafluoro-1-butene | 128.1 | 84.2 | 0.06 |
| CHF=CF—CHF—CH2F | 721945-94-4 | 1,2,3,4-Tetrafluoro-1-butene | 128.1 | 137.2 | 0.08 |
| CH2F—CF=CF—CH2F | 721946-32-3 | 1,2,3,4-Tetrafluoro-2-butene | 128.1 | 301.3 | 0.06 |
| CHF2—CF=CH—CH2F | 721946-31-2 | 1,1,2,4-Tetrafluoro-2-butene | 128.1 | 79.0 | 0.06 |
| CHF2—CF=CF—CH3 | 721946-30-1 | 1,1,2,3-Tetrafluoro-2-butene | 128.1 | 69.1 | 0.02 |
| CF2=CF—CHF—CH2F | 721946-04-9 | 1,1,2,3,4-Pentafluoro-1-butene | 146.1 | 54.7 | 0.012 |
| CHF=CF—CHF—CHF2 | 721946-09-4 | 1,2,3,4,4-Pentafluoro-1-butene | 146.1 | 68.2 | 0.029 |
| CHF2—CF=CH—CHF2 | 2252-99-5 | 1,1,2,4,4-Pentafluoro-2-butene | 146.1 | 53.5 | 0.026 |
| CHF2—CF=CF—CH2F | 119450-86-1 | 1,1,2,3,4-Pentafluoro-2-butene | 146.1 | 156.2 | 0.021 |
| CHF2—CF=CH—CHF2 | 2252-99-5 | 1,1,2,4,4-Pentafluoro-2-butene | 146.1 | 53.5 | 0.026 |
| CHF2—CF=CF—CHF2 | 17997-56-7 | 1,1,2,3,4,4-Hexafluoro-2-butene | 164.0 | 72.8 | 0.008 |

In a particularly desirably embodiment, the fluorinated alkene is one or more than one selected from a group consisting of the fluorinated alkenes in Table 1. The fluorinated alkenes in Table 1 are particularly desirable because they have high enough solubility in alkenyl aromatic polymers to prepare a quality thermally insulating alkenyl aromatic insulating polymer foam using only the one or more fluorinated alkene as a blowing agent. The fluorinated alkenes in Table 2 can comprise over 50 wt % of the blowing agent composition, but an additional blowing agent that is more soluble in the polymer matrix is necessary in the blowing agent composition to achieve quality foam. The additional blowing agent may or may not remain within the final foam.

The total concentration of fluorinated alkene blowing agents in the polymer foam is 0.03 moles or more, preferably 0.05 moles or more, more preferably 0.08 moles or more, still more preferably 0.1 moles or more per 100 grams of polymer foam and is 0.3 moles or less, typically 0.2 moles or less, more typically 0.15 moles or less per 100 grams of polymer foam. If the concentration of fluorinated alkene is less than 0.03 moles per 100 grams of polymer there is too little of it to contribute to the long-term thermal insulating properties of the polymer foam. If the concentration of fluorinated alkene exceeds 0.3 moles per 100 gram of polymer the gel viscosity of the polymer is so low that it is difficult to control stable foaming.

Polymer foams of the present invention have a density of 64 kilograms per cubic meter ($kg/m^3$) or less, preferably 60 $kg/m^3$ or less, more preferably 48 $kg/m^3$ or less, still more preferably 35 $kg/m^3$ or less, even more preferably 30 $kg/m^3$ or less. Lower density foams are typically better thermal insulating materials than higher density foams. However, polymer foams of the present invention typically have a density of 16 $kg/m^3$ or more in order to ensure the foam has sufficient structural integrity and compressive strength for use in a variety of thermally insulating applications. Measure density according to International Organization for Standardization (ISO) method 845-85.

Polymer foams of the present invention desirably have a thermal conductivity of 36 milliWatts per meter*Kelvin (mW/m*K) or less, preferably 32 mW/m*K or less and most preferably 30 mW/m*K or less. Measure thermal conductivity by ASTM method C-578 at 10° C. after aging the foam for 90 days. Alternatively, calculate thermal conductivity values as described in the Example section.

The polymer foam may contain additives. Typical additives include infrared attenuating agents (for example, any type of carbon black, graphite, Mica, aluminum powder, aluminum flake, aluminum oxide or titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane, phosphorous flame retardants such as triphenylphosphate, and flame retardant packages that may including synergists such as, or example, dicumyl and polycumyl); lubricants (for example, calcium stearate and barium stearate); and acid scavengers (for example, magnesium oxide and tetrasodium pyrophosphate). A preferred flame retardant package includes a combination of hexahalocyclododecane (for example, hexabromocyclododecane) and tetrabromobisphenol A bis(2,3-dibromopropyl ether. Additional additives may account for up to 25 wt %, typically up to 20 wt %, more typically up to 10 wt % of the polymer foam's total weight. Additional additive weight and polymer material weight combined typically accounts for all of the polymer matrix weight.

Process

Prepare the alkenyl aromatic polymer foam of the present invention according to a process comprising the following steps in order: (a) providing a foamable composition comprising a polymer and a blowing agent, wherein more than 50 wt % of the polymer consists of one or more alkenyl aromatic polymer; and (b) expanding the foamable composition into a polymer foam.

The polymer of the foamable composition is the polymer material as described for the polymer foam of the present invention. At least 50 wt % of the polymer material is one or more polymer selected from a group consisting of alkenyl aromatic polymers. Desirably, 75 wt % or more, 90 wt % or more, 95 wt % or more, or even 100 wt % of the polymer material is one or more alkenyl aromatic polymer. Desirably, the alkenyl aromatic polymer is selected from polystyrene polymers, styrene-acrylonitrile (SAN) copolymers and combinations thereof.

The blowing agent comprises one or more than one fluorinated alkene (that is, "the one or more than one fluorinated alkene") selected from a group consisting of those fluorinated alkenes listed in Tables 1 and 2. As noted under discussion of the polymer foam, these specific blowing agents are desirable for their low ODP, low GWP, low thermal conductivity and ability to prepare quality thermally insulating alkenyl aromatic polymer foam even when more than 50 wt % of the blowing agent consists of the one or more fluorinated alkene.

In a preferred embodiment, the one or more fluorinated alkene is selected from a group consisting of the fluorinated alkenes listed in Table 1. The fluorinated alkenes listed in Table 1 are particularly desirable because they have high enough solubility in alkenyl aromatic polymers to prepare a quality thermally insulating alkenyl aromatic insulating polymer foam using only the one or more fluorinated alkene as a blowing agent. The fluorinated alkenes in Table 2 can comprise over 50 wt % of the blowing agent composition, but an additional blowing agent that is more soluble in the polymer matrix may be necessary in the blowing agent composition to achieve quality foam. The additional blowing agent may or may not remain within the final foam.

In the process of the present invention, the one or more fluorinated alkene can account for more than 50 wt %, even 75 wt % or more of the total blowing agent weight. The one or more fluorinated alkene can account for 100 wt % of the blowing agent weight (that is, the blowing agent can consist of the one or more fluorinated alkene). The concentration of the one or more fluorinated alkene is sufficient to account for 0.03 moles or more, preferably 0.05 moles or more, more preferably 0.08 moles or more, still more preferably 0.1 moles or more per 100 grams of polymer foam and is 0.3 moles or less, typically 0.2 moles or less, more typically 0.15 moles or less per 100 grams of polymer.

In certain embodiments, the blowing agent can contain additional blowing agents besides the one or more fluorinated alkene. Suitable additional blowing agents include one or more than one of the following: inorganic gases such as carbon dioxide, argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (for example, difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC- 365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate. Particularly desirable additional blowing agents include one or both of water and carbon dioxide.

In one embodiment, the blowing agent consists of the one or more fluorinated alkene, water and carbon dioxide.

In another embodiment, the blowing agent consists of the one or more fluorinated alkene, one or more alkane and one or both of water and carbon dioxide.

The total amount of blowing agent in the foamable polymer composition is generally 5 wt % or more and 30 wt % or less of the total foamable composition weight. Alternatively, the total amount of blowing agent in the foamable composition is generally 0.08 mol or more per 100 grams of foamable polymer composition and 0.2 moles or less per 100 grams of foamable polymer composition.

The foaming process is desirably an extrusion process. An extrusion process typical requires preparing a foamable composition by melting or softening a polymer material and adding a blowing agent at an addition temperature and pressure sufficient to preclude expansion of the blowing agent. Melting or softening of the polymer material typically occurs in an extruder, along with mixing in additional additives. Addition of blowing agent can occur in the extruder or in a subsequent mixer. Expansion of the foamable composition typically occurs by expelling the foamable composition through a die at a foaming temperature into an environment at a lower pressure than the mixing pressure and allowing the blowing agent to expand the softened polymer material into a polymer foam. It is desirable to cool the foamable composition prior to expanding it into a foam so that the foaming temperature is lower than the mixing temperature.

The extrusion process may be continuous or may be a semi-continuous process such as an accumulation extrusion process. An accumulation extrusion process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam. U.S. Pat. No. 4,323,528, incorporated herein by reference, discloses such a process in a context of making polyolefin foams.

The process of the present invention can also be an expanded bead foam process. In an expandable foam bead process prepare a foamable composition in the form of beads or granules comprising a combination of polymer, any additives and blowing agent. Suspension polymerization methods are one suitable means of preparing foamable compositions in the form of beads or granules. In a suspension polymerization method, monomer is polymerized as it is suspended in a medium (typically an aqueous medium) as discrete particles (which become polymer beads or granules). Often, a blowing agent is combined with the monomer as it polymerizes and becomes incorporated into the polymer beads or granules. Alternatively, prepare polymer beads or granules by extruding a stream of polymer and cutting the stream into bead or granule sized pieces. The polymer can contain chemical blowing agents or the process can include imbibing the polymer beads or granules with a blowing agent to form a foamable composition in the form of beads. The beads or granules of foamable composition are typically then expanded within a mold to form a polymer foam comprising a multitude of expanded foam beads (granules) that adhere to one another to form a "bead foam." The foaming step typically entails exposing the foamable composition beads (granules) to steam to soften the polymer and encourage expansion of the blowing agent within the polymer. Bead foam has a characteristic continuous network of polymer skin corresponding to the surface of each individual bead extending throughout the foam and encompassing groups of cells that develop within each bead. Notably, extruded foam of the present invention is free of a continuous network of polymer skin that encompasses groups of cells within the foam.

Foams of the present invention desirably have a thickness (dimension perpendicular to a primary surface of the foam) of nine millimeters or more, preferably 10 millimeters or more, still more preferably 15 millimeters or more and most preferably 25 millimeters or more. Thicker foams are more desirable because they offer greater thermal insulating capability. However, thicker foams are also more difficult to prepare than thin foams such as foam sheet. Increasing the thickness increases the complexity of controlling the expansion of the foam cells since core cells experience different resistance forces than surface cells. In a foam sheet having a thickness of nine millimeters or less, nearly all cells are proximate to a foam surface. However, in thicker foams, that is not the case. Therefore, it is more difficult to control foam expansion to achieve desired foam density and cell sizes in the thicker foams that are desirable for thermal insulation.

Use

Polymer foam of the present invention is ideally suited for use as thermally insulating material. The fluorinated alkene provides long term thermal insulating capability to the foam while being environmentally friendly. A method of using the foam as a thermal insulating material comprises the step of positioning the polymer foam between two areas where one of the two areas experiences a different temperature than the other area. For example, a use of a foam of the present invention may comprise positioning the foam in a wall of a building structure. The polymer foam then can serve to thermally insulate the inside of the structure from temperature fluctuations on the outside of the building structure.

EXAMPLES

The following examples provide illustrations of embodiments of the present invention. Determine foam density according to ISO method 845-85, average cell size according to ASTM method D3576-04, and open cell content according to ASTM method D-6226-05.

Calculate thermal conductivity values using the method described by Misic and Thodos in "The Thermal Conductivity of Hydrocarbon Gases at Normal Pressures", A.I.Ch.E.

Journal, volume 7, page 264-67 (June 1961) and by employing heat capacity values obtained by using the Joback method for calculating heat capacity (see, Reid, Prausnitz and Poling, THE PROPERTIES OF GASES AND LIQUIED, 4$^{th}$ Edition, McGraw-Hill Book Company, pages 154-157 (1987)). Calculated thermal conductivities are for a 25 mm thick foam at 10° C. mean temperature after 90 days aging. Use Solubility PS values for polymer solubility and Permeability PS values for polymer permeability.

Weight parts per hundred (pph) values are based on total polymer weight unless otherwise indicated. The fluorinated alkenes are available from SynQuest Laboratories, Inc.

Examples (Ex) 1

Polystyrene Foam with a Fluorinated Alkene Blowing Agent

Prepare Ex 1 by feeding polystyrene homopolymer (M of 168,000) into an extruder at a temperature of approximately 200° C. with 0.3 weight-parts per hundred talc and 8 pph 3-fluoropropene ($CH_2=CH-CH_2F$) as a blowing agent at a pressure of 105 bar to form a foamable mixture. Cool the foamable mixture to approximately 123° C. and extrude at a pressure of approximately 69 bar through a slit die of about 3.175 millimeters into atmospheric pressure. The resulting foam (Ex 1) has a thickness of nine millimeters, a good skin quality, a density of 30.2 kg/m$^3$, an average cell size of 0.73 millimeters, an open cell content of 0% and a calculated thermal conductivity at 10° C. after 90 days of approximately 33.4 mW/m*K. Ex 1 is free of blowholes and has a cell size variation of 12.3%. Ex 1 comprises 0.133 moles of 3-fluoropropene per 100 grams of polymer foam.

Ex 1 illustrates that a quality foam can be prepared from polystyrene using a blowing agent from Table 1, in particular 3-fluoropropene, as the sole blowing agent.

Comparative Examples (Comp Exs) A and B

Table 2 Fluorinated Alkene in Polystyrene Foam

Prepare polystyrene foams as described for Ex 1 except use 3,3,3-trifluoropropene ($CH_2=CH-CF_3$) as the blowing agent and do not include talc. The mixing pressure is about 198 bar. Cool the foamable mixture to approximately 129° C. and extrude through a slit die at about 98 bar for Comp Ex A. Cool the foamable mixture to approximately 132° C. and extrude through a slit die at about 81 bar for Comp Ex B.

Comp Ex A has a poor skin quality, a density of 81.7 kg/m$^3$, an average cell size of 0.3 millimeters, an open cell content of 17% and a cell size variation of 69.5% and a calculated thermal conductivity at 10° C. after 90 days of approximately 28.6 mW/m*K. Comp Ex A comprises 0.083 moles of 3,3,3-trifluoropropene per 100 grams of polymer foam.

Comp Ex B has a poor skin quality, a density of 57.1 kg/m$^3$, an average cell size of 0.36 millimeters, an open cell content of 15%, a cell size variation of 63.4% and a thermal conductivity at 10° C. after 90 days of approximately 26.8 mW/m*K. Comp Ex B comprises 0.083 moles of 3,3,3-trifluoropropene per 100 grams of polymer foam.

Comp Exs A and B illustrate the inability to prepare a quality foam cannot from polystyrene using a blowing agent from Table 2, in particular 3,3,3-trifluoropropene, as the sole blowing agent.

Ex 2

Table 2 Fluorinated Alkene with Ethanol and Carbon Dioxide in Polystyrene

Prepare polystyrene foam in a manner similar to Com Exs A and B except use 11 pph total blowing agent having a composition of 64 wt % 3,3,3-trifluoropropene ($CH_2=CH-CF_3$), 9 wt % carbon dioxide and 27 wt % ethanol. The mixing pressure is approximately 95 bar. Cool the foamable mixture to approximately 130° C. and extrude the foamable composition through a slit die at a pressure of 68 bar prior and allow to expand into a foam (Ex 2). Notably, increasing the amount of blowing agent typically increases cell size variation and, hence, the likelihood of failing to achieve a quality foam.

Ex 2 has a good skin quality, a density of 29.2 kg/m$^3$, an average cell size of 0.085 millimeters, a cell size variation of 5.9%, an open cell content of 18%, is free of blowholes and has a calculated thermal conductivity at 10° C. after 90 days of approximately 27.2 mW/m*K. Ex 2 comprises 0.073 moles of 3,3,3-trifluoropropene per 100 grams of polymer foam.

Ex 2 illustrates a quality polystyrene foam made with over 50 wt % fluorinated alkene from Table 2 supplemented with carbon dioxide and ethanol.

Ex 3

Styrene-Acrylonitrile Foam with a Fluorinated Alkene Blowing Agent

Prepare Ex 3 in a manner similar to Ex 1 except use a styrene-acrylonitrile copolymer (15 wt % acrylonitrile, Mw of 118,000) and do not include talc. The mixing pressure is approximately 119 bar. Cool the foamable mixture to approximately 130° C. and extrude at a pressure of 75 bar through the slit die. The resulting foam (Ex 3) has a thickness of 13 millimeters, a good skin quality, a density of 52.4 kg/m$^3$, an average cell size of 1.5 millimeters, an open cell content of 3.2% and a calculated thermal conductivity at 10° C. after 90 days of approximately 35.4 mW/m*K. Ex 3 is free of blowholes and has a cell size variation of 23.0%. Ex 3 comprises 0.133 moles of 3-trifluoropropene per 100 grams of polymer foam.

Ex 3 illustrates that a quality foam can be prepared from styrene-acrylonitrile copolymer using a blowing agent from Table 1, in particular 3-fluoropropene, as the sole blowing agent.

Comp Ex C

Table 2 Fluorinated Alkene in Styrene-Acrylonitrile Foam

Prepare a styrene-acrylonitrile copolymer foam as described for Ex 3 except use 3,3,3-trifluoropropene ($CH_2=CH-CF_3$) as the blowing agent. The mixing pressure is of approximately 230 bar and the foaming pressure approximately 106 bar.

The resulting foam (Comp Ex C) has a poor skin quality, density of 64.6 kg/m$^3$, an average cell size of 0.335 millimeters and an open cell content of 5.1%. Comp Ex C has a cell size variation of 67.2% and a calculated thermal conductivity at 10° C. after 90 days of approximately 26.9 mW/m*K. Comp Ex C comprises 0.083 moles of 3,3,3-trifluoropropene per 100 grams of polymer foam.

Comp Ex C illustrates the inability to prepare a quality foam from styrene-acrylonitrile copolymer using a blowing agent from Table 2, in particular 3,3,3-trifluoropropene, as the sole blowing agent.

Ex 4

Table 2 Fluorinated Alkene with Water in Styrene-Acrylonitrile Foam

Prepare a styrene-acrylonitrile copolymer foam in a manner similar to that described for Comp Ex C except use 9.7 weight-parts per hundred weight parts polymer of a blowing agent consisting of 88 wt % 3,3,3-trifluoropropene ($CH_2$=CH—$CF_3$) and 12 wt % water. The mixing pressure is approximately 134 bar and the foaming pressure is approximately 82 bar.

The resulting foam (Ex 4) has a good skin quality, density of about 35.3 kg/$m^3$, an average cell size of a bout 0.175 millimeters, a cell size variation of about 14.3%, an open cell content of 0% and a calculated thermal conductivity at 10° C. after 90 days of approximately 25.7 mW/m*K. Ex 4 is free of blowholes. Ex 4 comprises 0.088 moles of 3,3,3-trifluoropropene per 100 grams of polymer foam.

Ex 4 illustrates the ability to prepare a quality styrene-acrylonitrile foam using a blowing agent containing over 50 wt % of a table 2 fluorinated alkene, 3,3,3-trifluoropropene, in combination with water.

Ex 5

Table 2 Fluorinated Alkene with Carbon Dioxide and Water in Styrene-Acrylonitrile Foam Prepare a styrene-acrylonitrile copolymer foam in a manner similar to that described for Comp Ex C except use 9.0 weight-parts per hundred weight parts polymer of a blowing agent consisting of 78 wt % 3,3,3-trifluoropropene ($CH_2$=CH—$CF_3$), 11 wt % carbon dioxide and 11 wt % water. The mixing pressure is approximately 135 bar and the foaming pressure is about 75 bar.

The resulting foam (Ex 5) has a good skin quality, a density of about 34.1 kg/$m^3$, an average cell size of about 0.13 millimeters, a cell size variation of about 7.7%, an open cell content of 0% and a calculated thermal conductivity at 10° C. after 90 days of approximately 26.2 mW/m*K. Ex 5 is free of blowholes. Ex 5 comprises 0.073 moles of 3,3,3-trifluoropropene per 100 grams of polymer foam.

Ex 5 illustrates the ability to prepare a quality styrene-acrylonitrile foam using a blowing agent containing over 50 wt % of a table 2 fluorinated alkene, 3,3,3-trifluoropropene, in combination with carbon dioxide and water.

Ex 6

Table 2 Fluorinated Alkene with Carbon Dioxide and Water in Styrene-Acrylonitrile Foam that is Flame Retardant Prepare a styrene-acrylonitrile polymer foam in a manner similar to that described for Ex 5 except include 2.5 weight-parts per hundred weight parts of copolymer of a flame retardant composition consisting of 95 wt % hexabromocyclododecane, 2 wt % tin stabilizer (Thermcheck PD832), one wt % Hydrotalcite DHJT4A and 2 wt % antioxidant (NAUGARD™ XL1, NAUGARD is a trademark of Chemtura Corporation). The mixing pressure is 134 bar and the foaming pressure is about 80 bar.

The resulting foam (Ex 6) has a good skin quality, a density of about 40.0 kg/$m^3$, an average cell size of about 0.31 millimeters, a cell size variation of about 24.6%, an open cell content of 0% and a calculated thermal conductivity at 10° C. after 90 days of approximately 26.6 mW/m*K. Ex 6 is free of blowholes. Ex 6 comprises 0.073 moles of 3,3,3-trifluoropropene per 100 grams of polymer foam.

Ex 6 has a bromine content of 1.59%, a Limit Oxygen Index (LOI) of 27.5% and an extinguishing time of less than 5 seconds when measured with the French M1 flame persistency according to the test method NF-P 92-5001/4/5. For comparison, Ex 5 is similar to Ex 6 except without the flame retardant. Ex 5 has a LOT of 19.5 and a flame extinguishing time of 50 seconds.

Ex 6 illustrates the ability to prepare a quality styrene-acrylonitrile foam having enhanced flame retardant properties using a blowing agent containing over 50 wt % of a table 2 fluorinated alkene, 3,3,3-trifluoropropene, in combination with carbon dioxide and water along with a flame retardant composition.

The invention claimed is:

1. An alkenyl aromatic polymer foam comprising a polymer matrix containing one or more polymer and defining a plurality of cells having an average cell size wherein:
    (a) the alkenyl aromatic polymer foam has:
        (i) an average cell size according to ASTM method D-3576-04 that is in a range of 0.02 and 5 millimeters;
        (ii) a density of 64 kilograms per cubic meter or less according to ISO method 845-85;
        (iii) an open cell content less than 30 percent according to ASTM method D6226-05; and
        (iv) a cell size variation of 30% or less; and
    (b) 50 weight-percent or more of the one or more polymer consists of one or more polymer selected from a group consisting of alkenyl aromatic polymers; and
    wherein the alkenyl aromatic polymer foam further comprises one or more fluorinated alkene blowing agent at a concentration of 0.03 moles or more and 0.3 moles or less per 100 grams of polymer foam, the one or more fluorinated alkene blowing agent being selected from a group consisting of: hexafluoropropene; 2-fluoropropene, 1-fluoropropene; 1,1-difluoropropene; 3,3-difluoropropene; 3,3,3-trifluoropropene; 2,3,3-trifluoropropene; 1,3,3,3-tetrafluoropropene; 1,1,3,3-tetrafluoropropene; 1,2,3,3,3-pentafluoropropene; 4,4,4-trifluoro-1-butene; 3,4,4,4-tetrafluoro-1-butene; 1,1,3,3,3-pentafluoro-2-methyl-1-propene; octafluoro-1-butene; octafluoro-2-butene; 2,3,3,4,4,4-hexafluoro-1-butene; 1,1,1,4,4,4-hexafluoro-2-butene; 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene.

2. The alkenyl aromatic polymer foam of claim 1, wherein the polymer foam is essentially free of blowholes.

3. The alkenyl aromatic polymer foam of claim 1, wherein the one or more fluorinated alkene is selected from a group consisting of 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene.

4. The alkenyl aromatic polymer foam of claim 1, wherein the one or more fluorinated alkene is the only blowing agent in the alkenyl aromatic polymer foam.

5. The alkenyl aromatic polymer foam of claim 1, wherein the alkenyl aromatic polymer is one or more polymer selected from polystyrene polymers and styrene-acrylonitrile copolymers.

6. The alkenyl aromatic polymer foam of claim 1, wherein the foam has a thickness that is nine millimeters or more.

7. A process for preparing an alkenyl aromatic polymer foam comprising the following steps in order:
(a) providing a foamable composition comprising a polymer and a blowing agent, wherein more than 50 weight-percent of the polymer consists of one or more alkenyl aromatic polymer; and
(b) expanding the foamable composition into a polymer foam of claim 1,
wherein the blowing agent comprises one or more fluorinated alkene at a concentration of 0.03 moles or more and 0.3 moles or less per 100 grams of polymer, the fluorinated alkene being selected from a group consisting of: hexafluoropropene; 2-fluoropropene, 1-fluoropropene; 1,1-difluoropropene; 3,3-difluoropropene; 3,3,3-trifluoropropene; 2,3,3-trifluoropropene; 1,3,3,3-tetrafluoropropene; 1,1,3,3-tetrafluoropropene; 1,2,3,3,3-pentafluoropropene; 4,4,4-trifluoro-1-butene; 3,4,4,4-tetrafluoro-1-butene; 1,1,3,3,3-pentafluoro-2-methyl-1-propene; octafluoro-1-butene; octafluoro-2-butene; 2,3,3,4,4,4-hexafluoro-1-butene; 1,1,1,4,4,4-hexafluoro-2-butene; 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene.

8. The process of claim 7, wherein more than 50 weight-percent of the blowing agent consists of one or more of the fluorinated alkenes.

9. The process of claim 7, wherein the blowing agent further comprises one or more blowing agent selected from a group consisting of fluorinated alkanes having from one to five carbons, hydrocarbons having from one to nine carbons, alcohols having from one to two to five carbons, water and carbon dioxide.

10. The process of claim 7, wherein the blowing agent consists of the one or more fluorinated alkene and one or more blowing agent selected from carbon dioxide and water.

11. The process of claim 7, wherein the one or more fluorinated alkene is selected from a group consisting of 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-Pentafluoro-1-butene; 1,2,3,3,4,4,4-Heptafluoro-1-butene; 1,1,2,3,4,4,4-Heptafluoro-1-butene; and 1,3,3,3-tetrafluoro-2-(trifluoromethyl)-Propene.

12. The process of claim 11, wherein the blowing agent consists of the one or more fluorinated alkene.

13. The process of claim 7, wherein the alkenyl aromatic polymer is one or more polymer selected from polystyrene polymers, styrene-acrylonitrile copolymer and blends thereof.

14. The process of claim 7, wherein the one or more alkenyl aromatic polymer comprises 95 weight-percent or more of the polymer in the foamable composition.

15. The process of claim 7, wherein the process is an extrusion process where step (a) includes softening the polymer in an extruder, mixing the blowing agent into the softened polymer at an addition temperature and addition pressure to form the foamable composition and then cooling the foamable composition to a foaming temperature and step (b) includes expelling the foamable composition through a die at the foaming temperature into an environment at a lower pressure than the mixing pressure.

16. The process of claim 7, wherein the process is an expanded bead foam process where the foamable composition in step (a) is in the form of beads and step (b) includes steam expanding the polymer beads.

17. The process of claim 7, wherein step (b) requires expanding the foamable composition into a polymer foam having a thickness of nine millimeters or more.

18. A method of using the alkenyl aromatic polymer foam of claim 1 comprising the step of positioning the polymer foam between two areas where one of the two areas experiences a different temperature than the other area.

* * * * *